(12) United States Patent
Furukawa et al.

(10) Patent No.: US 8,659,593 B2
(45) Date of Patent: Feb. 25, 2014

(54) IMAGE PROCESSING APPARATUS, METHOD AND PROGRAM

(75) Inventors: Ryo Furukawa, Hiroshima (JP);
Hiroshi Kawasaki, Saitama (JP);
Akihiko Morisaka, Niiza (JP); Tomoya Itano, Kawasaki (JP)

(73) Assignees: Techno Dream 21 Co., Ltd., Saitama-shi (JP); National University Corporation Saitama University, Saitama-shi (JP)

( * ) Notice: Subject to any disclaimer, the term of this patent is extended or adjusted under 35 U.S.C. 154(b) by 897 days.

(21) Appl. No.: 12/670,953

(22) PCT Filed: Jul. 24, 2008

(86) PCT No.: PCT/JP2008/001970
§ 371 (c)(1),
(2), (4) Date: Jan. 27, 2010

(87) PCT Pub. No.: WO2009/016808
PCT Pub. Date: Feb. 5, 2009

(65) Prior Publication Data
US 2010/0231583 A1    Sep. 16, 2010

(30) Foreign Application Priority Data
Jul. 27, 2007   (JP) .................................. 2007-196740

(51) Int. Cl.
*G06T 19/00*   (2011.01)
*G06T 15/08*   (2011.01)

(52) U.S. Cl.
USPC .......................................... 345/419; 345/424

(58) Field of Classification Search
None
See application file for complete search history.

(56) References Cited

U.S. PATENT DOCUMENTS 6,084,979 A *   7/2000   Kanade et al. ................ 382/154
2005/0057561 A1 *   3/2005   El-Din ElShishiny et al. ............................ 345/419

FOREIGN PATENT DOCUMENTS

| JP | A 2000-111324 | 4/2000 |
| JP | A 2001-84403 | 3/2001 |
| JP | A 2002-56380 | 2/2002 |
| JP | A 2002-236936 | 8/2002 |
| JP | A 2002-366934 | 12/2002 |
| JP | A 2003-58904 | 2/2003 |
| JP | A 2005-38219 | 2/2005 |

OTHER PUBLICATIONS

Alberto Elfes and Larry Matthies, "Sensor Integration for Robot Navigation: Combining Sonar and Stereo Range Data in a Grid-Based Representation", Proceedings of the 26th Conference on Decision and Control, Los Angeles, CA, Dec. 1987, pp. 1802-1807.*

(Continued)

*Primary Examiner* — Kee M Tung
*Assistant Examiner* — Sing-Wai Wu
(74) *Attorney, Agent, or Firm* — Oliff PLC

(57) ABSTRACT

The image processing apparatus of the present invention comprises signed distance calculation unit calculating signed distance fields from each input 3D shape data, signed distance integration unit integrating all the signed distances calculated by signed distance calculation unit for each shape data, classification unit classifying each voxel to be outside of the observed object, near the surface of the object or the other, estimation unit estimating whether voxel is inside or outside of the object, and determination unit determining voxel to be inside, outside or near-surface of the object based on the calculation results of the previous units.

23 Claims, 9 Drawing Sheets

(56) References Cited

OTHER PUBLICATIONS

H. Hoppe, T. DeRose, T. Duchamp, J. McDonald, and W. Stuetzle, "Surface reconstruction from unorganized points", Computer Graphics (SIGGRAPH '92 Proceedings), vol. 26, pp. 71-78, Jul. 1992.*

Larsen E. S, McAllister D., "Fast matrix multiplies using graphics hardware", Proceedings of the 2001 ACM/IEEE Conference on Supercomputing (New York, NY, USA, 2001), ACM Press, p. 55.*

G.G. Slabaugh, R.W. Schafer and M.C. Hans, "Multi-resolution spacing carving using level set methods", Proc. IEEE ICIP'02, Rochester, NY, Sep. 2002, vol. 2, II.545-II.548.*

C. Zach, A. Klaus, M. Hadwiger, adn K. Karner, "Accurate dense stereo reconstuction using graphics hardware", Eurographics 2003, Short Presentations, 2003 available as report from www.vrvis.at.*

12670953_Authorization_ExaminersAmendment_100413.*

12670953_PROPOSED EX AMDS_100413.*

Curless et al., "A Volumetric Method for Building Complex Models from Range Images," Computer Graphics, vol. 30, Annual Conference Series, 1996, pp. 303-312.

Turk et al., "Zippered Polygon Meshes from Range Images," SIGGRAPH 1994, Proceedings of the 21$^{st}$ Annual Conference on Computer Graphics and Interactive Techniques, 1994, pp. 311-318.

Davis et al, "Filling Holes in Complex Surfaces using Volumetric Diffusion," Proc. First International Symposium on 3d Data Processing, Visualization, Transmission, 2002, pp. 428-438.

Sagawa et al., "Taking Consensus of Signed Distance Field for Complementing Unobservable Surface," Proc. 3DIM 2003, 2003, pp. 410-417.

Sagawa et al., "Taking Consensus of Signed Distance Field for Hole Filling," IEICE D, vol. J88-D-II, No. 3, 2005, pp. 541-551.

Masuda, "Filling the Signed Distance Field by Fitting Local Quadrics," Proceedings of the 2$^{nd}$ International Symposium on 3D Data Processing, Visualization, and Transmission, 2004, pp. 1003-1010.

Nitschke et al., "Real-Time Space Carving Using Graphics Hardware," MIRU 2006, pp. 928-933.

Sud et al., "Interactive 3D Distance Field Computation using Linear Factorization," SI3D '06: Proceedings of the 2006 Symposium on Interactive 3D Graphics and Games, 2006, pp. 117-124.

Lorensen et al., "Marching Cubes: A High Resolution 3D Surface Construction Algorithm," SIGGRAPH '87: Proceedings of the 14$^{th}$ Annual Conference on Computer Graphics and Interactive Techniques, vol. 21, 1987, pp. 163-169.

Gomita et al., "Accelerating 2-D/3-D Rigid Registration Using Commodity Graphics Hardware," Transactions of Information Processing Society of Japan (IPSJ), Oct. 2006, vol. 47, No. 10, pp. 2947-2958. (with English-language abstract).

Sagawa et al., "A Probabilistic Method for Aligning and Merging Range Images with Anisotropic Error Distribution," In Proc. Third International Symposium on 3D Data Processing, Visualization and Transmission, Jun. 2006, pp. 559-566.

International Search Report issued in corresponding International Application No. PCT/JP2008/001970, mailed Sep. 22, 2008. (with English-language translation).

Written Opinion of the International Searching Authority issued in corresponding International Application No. PCT/JP2008/001970, mailed Sep. 22, 2008. (with English-language translation).

* cited by examiner

Figure 10

| Methods | Execution time(sec.) | |
| --- | --- | --- |
| | Synthetic data | Real data |
| SC | 55 | 38 |
| VD | 168 (merge:53 sec., interpolate:115 sec.) | 120 (merge:36 sec., interpolate:84 sec.) |
| Consensus | 15 min. (merge:15 min., interpolate:18 sec.) | 7 hours (merge: 7 hours, interpolate:280 sec.) |
| Proposed | 25(No smoothing) 36*(Smoothing) | 21 (No smoothing) 28*(Smoothing) |

Figure 11

| Process | Exec. time(sec.) | |
| --- | --- | --- |
| | Synthetic | Real |
| Initialize and low resolution process | 4 | 4 |
| Rendering on GPU | 11 | 7 |
| Volume processing(includes smoothing) | 12 | 10 |
| Mesh generation(MC) | 9 | 7 |
| Total | 36 | 28 |

Figure 12

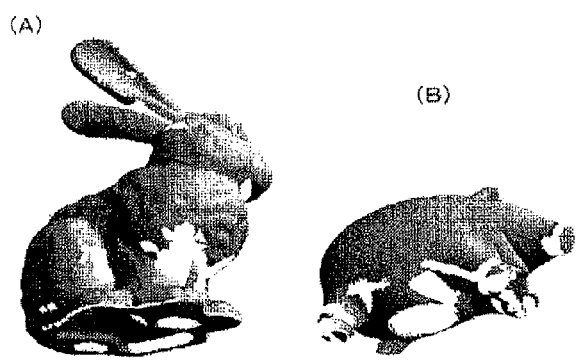

(A)

(B)

IMAGE PROCESSING APPARATUS, METHOD AND PROGRAM

FIELD OF THE INVENTION

The present invention relates to an image processing, method and program and especially it relates to an image processing, method and program for integrating multiple 3-dimensional data.

BACKGROUND OF THE INVENTION

Shape data obtained by 3D measurement systems are often represented as distance images. In order to obtain the entire shape model from multiple measurement results, it is necessary to integrate these distance images. To integrate multiple distance data into a single shape, several types of approaches have been proposed, such as, stitching meshes at the overlapped surfaces (zippering) [Non Patent Literature 1], and methods using signed distance fields [Non Patent Literature 2]. Among them, the methods using signed distance fields have been widely researched because they are capable of processing a large volume of input data efficiently. A signed distance field is a scalar field defined for each voxel in 3D space such that the absolute value of the scaler is the distance between the voxel and the object surface and the sign of the scaler indicates whether the voxel is inside or outside of the object. Generally, isosurface satisfying signed distance value to be 0 defines an object's surface. Therefore, signed distance fields can be considered as one of the shape representation method. Signed distance fields have also been used for interpolating holes appearing in unmeasured parts of object surfaces.

Curless and Levoy filled holes of a measured shape by classifying each voxel in volume space as either Unseen (unseen regions), NearSurface (near the surfaces), or Empty (outside the object), and generating a mesh between Unseen and Empty regions [Non Patent Literature 1]. This process is known as space carving (henceforth abbreviated to SC) due to its resemblance to a process of carving the outside of the object in the volume. The SC method is capable of effectively interpolating missing parts when there is plenty of observed data. However, when only a few distance images are captured, the SC method often fails. This problem occurs because the target object and the "remains of carving" in volume space become connected.

One of the approaches to solve this problem would be classifying the Unseen voxels as either inside or outside of the object. Since Unseen voxels include both unobserved voxels inside an object (due to occlusion or low reflection) and voxels outside the object, it is necessary to distinguish these cases.

Regarding filling holes of the surface of the shape defined as isosurfaces of signed distance fields, a number of methods have already been proposed. Davis et al. presented a method for interpolating shape data expressed as an isosurface, in which signed distance field volume data is diffused using a smoothing filter and combined with the original signed distance field [Non Patent Literature 3].

In [Non Patent Literature 4] and [Non Patent Literature 5], interpolating scenes with complex objects by taking the consensus between each voxel in a signed distance field with its surrounding voxels was realized successfully. In [Non Patent Literature 6], the method for filling unmeasured regions by fitting quadrics to the gaps in the signed distance field was proposed.

In recent years, many methods have been proposed for utilizing the rapid improvement in the computational performance of GPUs for general calculations besides graphics. Nitschke et al. proposed a method for implementing 3D reconstruction from 2D contours using the SC method on GPUs [Non Patent Literature 7]. Also, For example, Sud et al., presented a high-speed method for calculating distance fields from object models using GPUs, and demonstrated that it could be used for measuring the distance between adjacent objects [Non Patent Literature 8].

In addition, there exist several patent literatures related to this patent, such as patent literatures from 1 to 7 as follows. Although those patents have in common with realizing 3D shape reconstruction, there exist obvious differences between those previous patents and the present invention, for example data is different and thereof.

In the patent literature 1, the method to reconstruct the shape of boundary from volume data is disclosed. Especially application for CT and MRI is disclosed.

In the patent literature 2, the technique to improve the reconstruction quality of the shape of thin part of the object when integrating multiple 3-dimensional data with volumetric method is disclosed.

In the patent literature 3, the image processing method on volume data which is reconstructed based on silhouette technique is disclosed.

In the patent literature 4, the method to improve the accuracy on shape integration of multiple 3D data using the value called vector potential instead of scalar value of volume (in the common literature) is disclosed.

In the patent literature 5, the method to improve the accuracy using the direction of the vector when 3D data are integrated by using vector potential in the patent literature 4 is disclosed.

In the patent literature 6, since an intermediate data is large before shape integration in the patent literature 4, the method to reduce the intermediate data is disclosed.

In the patent literature 7, the invention to utilize the shape integration method using volume (signed distance field) to stitch multiple shape data, those shapes are largely different each other, is disclosed.

[Non Patent Literature 1] B. Curless and M. Levoy: "A volumetric method for building complex models from distance images", Computer Graphics, 30, Annual Conference Series, pp. 303-312 (1996).

[Non Patent Literature 2] G. Turk and M. Levoy: "Zippered polygon meshes from range images", SIGGRAPH 1994: Proceedings of the 21$^{st}$ annual conference on Computer graphics and interactive techniques, New York, N.Y., USA, ACM Press, pp. 311-318 (1994).

[Non Patent Literature 3] J. Davis, S. R. Marschner, M. Gaff and M. Levoy: "Filling holes in complex surfaces using volumetric diffusion.", 3DPVT, pp. 428-438 (2002).

[Non Patent Literature 4] R. Sagawa and K. Ikeuchi: "Taking consensus of signed distance field for complementing unobservable surface", Proc. 3DIM 2003, pp. 410-417 (2003).

[Non Patent Literature 5] Ryusuke SAGAWA and Katsushi IKEUCHI: "Taking Consensus of Signed Distance Field for Hole Filling", IEICE D, J88-D2,3, pp. 541-551 (2005).

[Non Patent Literature 6] T. Masuda: "Filling the signed distance field by fitting local quadrics", 3DPVT '04: Proceedings of the 3D Data Processing, Visualization, and Transmission, 2nd International Symposium on (3DPVT2004), Washington, D.C., USA, IEEE Computer Society, pp. 1003-1010 (2004).

[Non Patent Literature 7] C. NITSCHKE, A. NAKAZAWA and H. TAKEMURA: "Real-time space carving using graphics hardware", MIRU 2006, pp. 928-933 (2006).

[Non Patent Literature 8] A. Sud, N. Govindaraju, R. Gayle and D. Manocha: "Interactive 3d distance field computation using linear factorization", SI3D '06: Proceedings of the 2006 symposium on Interactive 3D graphics and games, New York, N.Y., USA, ACM Press, pp. 117-124 (2006).

[Non Patent Literature 9] W. E. Lorensen and H. E. Cline: "Marching cubes: A high resolution 3d surface construction algorithm", SIGGRAPH '87: Proceedings of the 14th annual conference on Computer graphics and interactive techniques, Vol. 21, New York, N.Y., USA, ACM Press, pp. 163-169 (1987).

[Patent Literature 1] Japan Patent Application publication 2005-038219

[Patent Literature 2] Japan Patent Application publication 2003-058904

[Patent Literature 3] Japan Patent Application publication 2002-366934

[Patent Literature 4] Japan Patent Application publication 2000-111324

[Patent Literature 5] Japan Patent Application publication 2002-236936

[Patent Literature 6] Japan Patent Application publication 2002-056380

[Patent Literature 7] Japan Patent Application publication 2001-084403

SUMMARY OF THE INVENTION

Technical Problem

However, the SC method [Non Patent Literature 1] first initializes all the voxels to be Unseen, and then, "carves" the voxels which exist between each pixel of distance image and the viewpoint (unlike the space curving method for shape reconstruction from silhouette of 2D image, the method carves all the voxels in front of the surface where data exist on a distance image and leave the surrounded voxels which are not observed). This method only carves the volume space in front of the observed surfaces, so, in practice, the unobserved voxels outside of the object remain as Unseen, and excess meshes are generated on the borders between the Unseen and the Empty regions. When distance images from a sufficient number of observation points are integrated, this kind of excess meshes is not connected to the target object mesh, and can be simply pruned away. However, when the number of observation points is small, or when the object is not observed from certain directions, the excess meshes often become connected to the object. This is problematic for many applications.

In terms of the technique described in [Non Patent Literature 3], as shown in the experiments later, this method sometimes propagates the isosurface in incorrect directions and yields undesirable results. In particular, when missing parts of a shape are caused by self occlusion, interpolation often fails.

In terms of the techniques described in [Non Patent Literature 4] to [Non Patent Literature 6], they use a Euclidean distance for their calculation to achieve high quality interpolation at the cost of high computational complexity.

In addition, integration of multiple 3D distance images is usually processed by CPU (Central Processing Unit) on personal computer, and, since enormous computational cost is required for integration of multiple 3D distance images, there exists a problem that it takes a long time for integration.

The present invention is published by considering the aforementioned problems. The main target of the invention is to provide an image processing apparatus etc. to achieve integration of multiple 3D shape data with high accuracy.

Solution to Problem

The present invention is an image processing apparatus for merging a plurality of shape data representing a shape of an object, the apparatus comprising:

a first calculation unit configured to receive 3-D positions representing voxels, each of which is a unit for dividing a 3-D space, and the shape data and to perform a calculation of first signed distances, each of which is a signed distance between the 3-D position and the shape data, on the shape data;

a second calculation unit configured to classify the voxels into a voxel that is located in a near-surface of the shape, a voxel that is located outside of the shape, or a voxel that cannot be determined to be located outside of the shape or in the near-surface based on the 3-D position representing each of the voxels and one or both of any one of the plurality of shape data and the first signed distances;

a third calculation unit configured to estimate whether the voxel that cannot be determined to be located outside of the shape or in the near-surface is located inside of the shape or outside of the shape based on one or both of the plurality of shape data and the first signed distances; and a fourth calculation unit configured to calculate the 3-D positions of the voxels that are classified to be located in the near-surface and the 3-D positions of the voxels that are located in a boundary portion between the voxels that are classified or estimated to be located inside the shape and the voxels that are classified or estimated to be located outside the shape, as surface positions of the shape.

The present invention is an image processing method of merging a plurality of shape data representing a shape, the method comprising:

a first step of receiving 3-D positions representing voxels, each of which is a unit for dividing a 3-D space, and the shape data and performing a calculation of first signed distances, each of which is a signed distance between the 3-D position and the shape data, on the shape data;

a second step of classifying the voxels into a voxel that is located in a near-surface of the shape, a voxel that is located outside of the shape, or a voxel that cannot be determined to be located outside of the shape or in the near-surface based on the 3-D position representing each of the voxels and one or both of any one of the plurality of shape data and the first signed distances;

a third step of estimating whether the voxel that cannot be determined to be located outside of the shape or in the near-surface is located inside of the shape or outside of the shape based on one or both of the plurality of shape data and the first signed distances; and a fourth step of calculating the 3-D positions of the voxels that are classified to be located in the near-surface and the 3-D positions of the voxels that are located in a boundary portion between the voxels that are classified or estimated to be located inside the shape and the voxels that are classified or estimated to be located outside the shape, as surface positions of the shape.

The present invention is a program for executing functions of an image processing apparatus for merging a plurality of shape data representing a shape, wherein the functions comprises:

a first function for receiving 3-D positions representing voxels, each of which is a unit for dividing a 3-D space, and the shape data and performing a calculation of first signed distances, each of which is a signed distance between the 3-D position and the shape data, on the shape data;

a second function for classifying the voxels into a voxel that is located in a near-surface of the shape, a voxel that is located outside of the shape, or a voxel that cannot be determined to be located outside of the shape or in the near-surface based the 3-D position representing each of the voxels and on one or both of any one of the plurality of shape data and the first signed distances;

a third function for estimating whether the voxel that cannot be determined to be located outside of the shape or in the near-surface is located inside of the shape or outside of the shape based on one or both of the plurality of shape data and the first signed distances; and a fourth function for calculating the 3-D positions of the voxels that are classified to be located in the near-surface and the 3-D positions of the voxels that are located in a boundary portion between the voxels that are classified or estimated to be located inside the shape and the voxels that are classified or estimated to be located outside the shape, as surface positions of the shape.

The present invention is an image processing apparatus for merging a plurality of input shape data by using calculation functions of a GPU, comprising:

a first storage area which is a portion of a storage unit of the GPU and which stores the shape data;

a second storage area which is a portion of the storage unit of the GPU and which stores information on voxels which are elements dividing a 3-D space;

a first calculation unit which is a portion of the calculation unit of the GPU and which is configured to calculate first signed distances, each of which is a signed distance between a 3-D position representing each of the voxels and the shape data, with respect to the shape data read from the first storage area; and a second calculation unit which is a portion of the calculation unit of the GPU and which is configured to calculate a second signed distance by merging the first signed distances calculated with respect to the shape data and to store the second signed distance in the second storage area.

The present invention is an image processing method of merging a plurality of input shape data by using calculation functions of a GPU, the method comprising:

a first step of acquiring a first storage area which is a portion of a storage unit of the GPU and which stores the shape data and a second storage area which is a portion of the storage unit of the GPU and which stores information on voxels which are elements dividing a 3-D space;

a second step of calculating first signed distances, each of which is a signed distance between a 3-D position representing each of the voxels and the shape data, with respect to the shape data read from the first storage area by using the calculation functions of the GPU; and a third step of calculating a second signed distance by merging the first signed distances calculated with respect to the shape data and to store the second signed distance in the second storage area by using the calculation functions of the GPU.

The present invention is a program for executing functions of an image processing apparatus for merging a plurality of input shape data by using calculation functions of a GPU, wherein the functions comprises:

a first function for acquiring a first storage area which is a portion of a storage unit of the GPU and which stores the shape data and a second storage area which is a portion of the storage unit of the GPU and which stores information on voxels which are elements dividing a 3-D space;

a second function for calculating first signed distances, each of which is a signed distance between a 3-D position representing each of the voxels and the shape data, with respect to the shape data read from the first storage area by using the calculation functions of the GPU; and a third function for calculating a second signed distance by merging the first signed distances calculated with respect to the shape data and to store the second signed distance in the second storage area by using the calculation functions of the GPU.

Advantageous Effects of Invention

In the proposed method, since not only the observed voxels in a signed distance field, but also unseen voxels are determined as either inside or outside of an object using Bayes estimation, shape integration and interpolation are stably realized even when the number of distance images is small. Therefore, the space carving method is improved by the invention. In addition, in the case that the distance image is obtained using an active stereo method, high precision estimation results can be achieved.

Furthermore, in this invention, GPU is used for calculation of signed distance field and the discriminant function whether the voxel is inside or outside the object for the purpose of integration of distance images, and thus, extremely fast calculation can be achieved.

BRIEF DESCRIPTION OF THE DRAWINGS

FIG. 10 The figure illustrates the execution time of the method and other method for image processing.

FIG. 11 The figure illustrates the detail of the execution time of the invention shown in FIG. 10.

FIGS. 12(A) and (B) illustrate the integration results without interpolation.

REFERENCE SIGNS LIST

Figure 1:
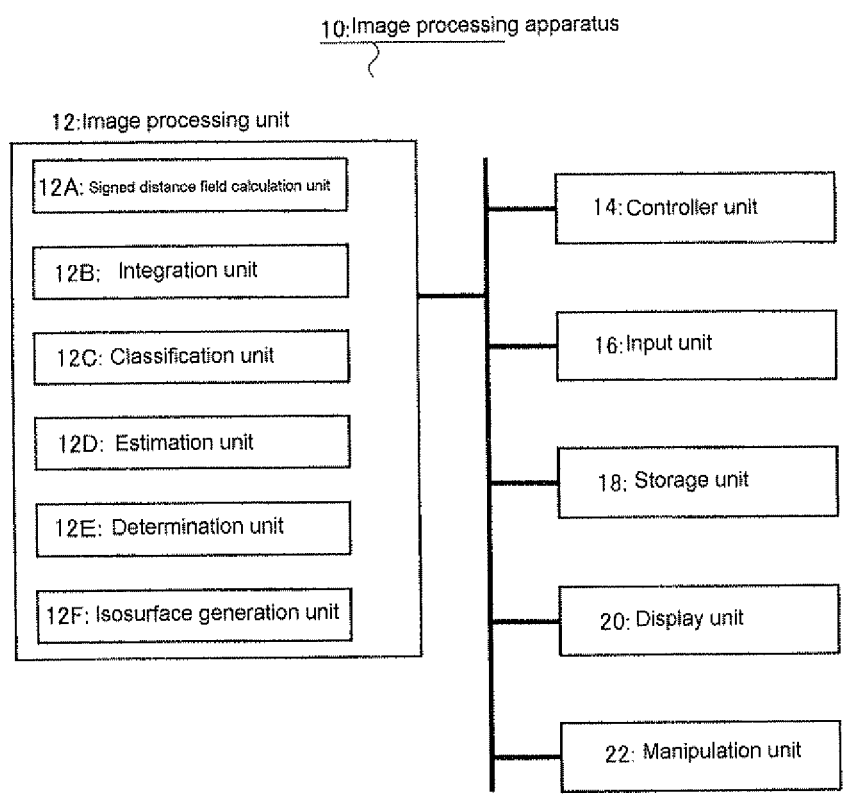
FIG. 1 The figure illustrates the image processing apparatus of the invention.

10 Image processing apparatus
12 Image processing unit
12A Signed distance field calculation unit
12B Integration unit
12C Classification unit
12D Estimation unit
12E Determination unit
12F Isosurface generation unit
14 Controller unit
16 Input unit
18 Storage unit
20 Display unit
22 Manipulation unit
30 Image processing apparatus
32 Image processing unit
32A The first storage area
32B The second storage area
32C Signed distance field calculation unit
32D Signed distance field Integration unit
32E Isosurface generation unit
34 Controller unit
36 Input unit
38 Storage unit
40 Display unit
42 Manipulation unit

DETAILED DESCRIPTION OF EMBODIMENTS

Overview of the image processing apparatus and others of the present invention will now be described. The present patent is for achieving the improvement of accuracy of shape integration and interpolation of SC method by further classifying the voxel which is defined as Unseen by SC method to be "inside" or "outside" of the object.

To achieve this, we take the following two approaches:
(1) Introducing discriminant function for classifying Unseen voxels based on Bayes estimation, and
(2) using the positions of light sources if the distance images are obtained using active stereo methods.

Regarding these approaches, (1) may be used alone, but using both simultaneously is more effective. Under the invention, the large "remains of carving" that often occurs in SC method are not generated. Also, since all voxels are classified as inside, outside or near the surface of the object, closed shapes are always obtained.

On the other hand, in recent years, methods using Graphics Processing Units (GPUs) have been researched extensively as ways of processing a large amount of calculation efficiently. GPUs are processors which are originally used for graphics computations, but it has become possible to define their operations with programs, and they may be used as high speed SIMD parallel processors. Calculation for construction of the signed distance field and the discriminant function for classifying voxels can be implemented on GPU and it can achieve the significant improvement on efficiency of processing. Those matters are further described in the third and the forth embodiment of the present invention.

First Embodiment

Configuration of the Image Processing Apparatus

Configuration of the image processing apparatus regarding to the embodiment of the present invention will now be explained referring to FIG. 1.

An image processing apparatus 10 according to the embodiment mainly includes an image processing unit 12, a control unit 14, an input unit 16, a storage unit 18, a display unit 20, and a manipulation unit 22. The schematic function of the image processing apparatus 10 is to integrate a plurality of input 3-D shape data so as to generate one 3-D shape data. In addition, an implemented image processing apparatus 10 may be constructed with a computer such as a personal computer where an application (program) of executing a predetermined function is installed or a dedicated image-processing apparatus of executing a predetermined function. In addition, units constituting the image processing apparatus 10 are electrically connected to each other via a bus.

The image processing unit 12 is a unit that mainly performs an image processing function. The image processing unit 12 includes a signed distance calculation unit 12A, a merging unit 12B, a classification unit 12C, an estimation unit 12D, a determination unit 12E, and an isosurface formation unit 12F.

The signed distance calculation unit 12A is a unit that calculates a signed distance (first signed distance) of each voxel of a volume on the input 3-D shape data (distance image) (first calculation unit disclosed in Claim 1).

The merging unit 12B is a unit that calculates an integrated signed distance (second signed distance) by adding the signed distances with respect to the shape data in the signed distance calculation unit 12A (fifth calculation unit disclosed in Claim 2).

The classification unit 12C is a unit that classifies the voxels into a voxel that is located outside an observed shape of an object, a voxel that is located in a near-surface, and a voxel that is located neither outside the shape nor in the near-surface (second calculation unit disclosed in Claim 1).

The estimation unit 12D is a unit that estimates based on the plurality of input shape data whether the voxel is located inside or outside the observed shape of the object (third calculation unit disclosed in Claim 1).

The determination unit 12E is a unit that determines based on the result of classification of the classification unit 12C and the result of estimation of the estimation unit 12D whether the voxel is located inside the shape, outside the shape, or in the near-surface. Next, if the voxel is determined to be located in the near-surface, the second signed distance of the voxel is output to the storage unit 18 (fourth calculation unit disclosed in Claim 1).

The isosurface formation unit 12F is a unit that generates an isosurface based on the second signed distance output from the determination unit 12E so as to generate a mesh model (sixth calculation unit disclosed in Claim 12).

The control unit 14 is a unit that controls operations of the entire units of the image processing apparatus 10 (the image processing unit 12, the input unit 16, the storage unit 18, and the display unit 20).

The input unit 16 is a unit where information is externally input to the image processing apparatus 10. In the embodiment, a plurality of the 3-D shape data is input from the input unit 16.

The storage unit 18 is a fixed storage disk such as a HDD (hard disk drive), a detachable storage disk such as a CD (compact Disc) or DVD (digital versatile disk), a fixed or detachable semiconductor device, or the like. In the embodiment, a plurality of the 3-D shape data before the process and 3-D shape data generated by margining the plurality of 3-D shape data are stored in the storage unit 18.

In addition, a program for executing the image processing method described later is stored in the storage unit 18. The program allows functions of the aforementioned units to be executed by user's manipulation of the manipulation unit 22.

More specifically, the units of the program are operated so that new 3-D image data are generated by merging the input 3-D shape data.

The display unit 20 is, for example, a liquid crystal display, a CRT (cathode ray tube), a video projector, or the like. An image is displayed on the display unit 20 based on the input 3-D shape data or the integrated 3-D shape data.

The manipulation unit 22 is, for example, a keyboard or a mouse. By the user's manipulation of the manipulation unit 22, the image processing apparatus 10 integrates a plurality of the 3-D shape data.

The image processing apparatus 10 has the aforementioned configuration. In addition to the aforementioned configuration, for example, a photographing means such as a camera of acquiring the 3-D shape data may be added.

Herein, the processes of the aforementioned units may be repeated sequentially on all the voxels of the volume. In addition, the processes of the aforementioned units may be repeated independently on all the voxels of the volume.

Second Embodiment

Image Processing Method

In the embodiment, a method of merging a plurality of 3-D shape data is described.

Figure 2:
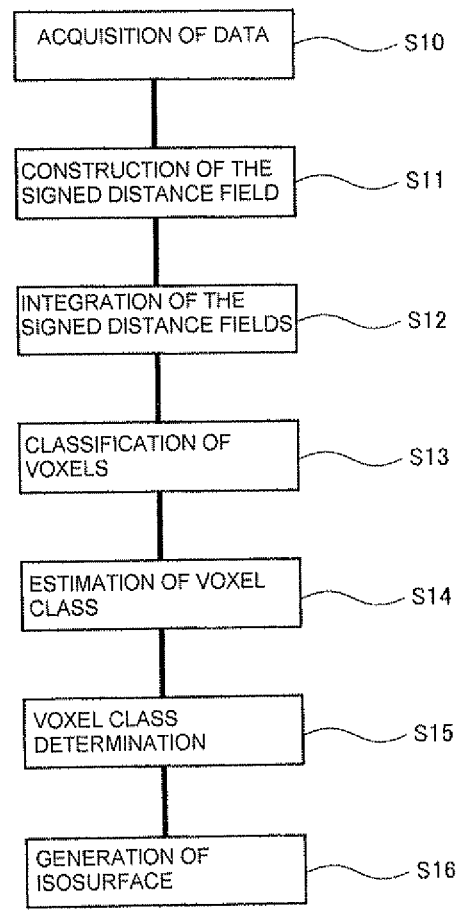
FIG. 2 The figure illustrates the flowchart of image processing method of the invention.

Referring to FIG. 2, an image processing method according to the embodiment includes: a step S10 of acquiring a plurality of 3-D shape data; a step S11 (first step) of calculating a signed distance of each of 3-D shape data; a step S12 (second step) of merging the signed distances of the plurality of 3-D shape data and merging signed distance fields of voxels; a step S13 (third step) of classifying the voxels into a voxel located outside a shape, a voxel located in a near-surface, and a voxel not located outside the shape and in the near-surface; a step S14 (fourth step) of estimating based on a later-described discriminant function whether the voxel is located inside or outside the shape of the object; a step S15 (fifth step) of determining based on the results of the steps 13 and 14 whether the voxel is located inside the shape, whether the voxel is located outside the shape, or whether the voxel is located in the near-surface; and a step S16 of generating an isosurface (that is, forming a mesh model) from the integrated signed distance fields. Hereinafter, these steps are described in detail.

Step S10: Acquisition of Data

In the step, 3-D measurement is performed, and a distance image is generated from an image obtained by the measurement. As a format of the 3-D shape data, in addition to the distance image, there may be polygons, point clouds, signed distance fields, volume data, or the like.

As the 3-D measurement, there may be used a non-contact type apparatus such as a laser range finder or a contact type scanner. In addition, if an active stereo method such as a pattern code method using a projector and a camera is used, accuracy can be improved for the reasons described later. In this method, a light stripe pattern called a gray code is projected on an object by a projector and the shape thereof is photographed by a camera. The distance image can be obtained by performing this task.

Step S11: Construction of the Signed Distance Field

A signed distance field is a scalar field defined for each voxel in 3D space such that the absolute value of the scaler is the distance between the voxel and the object surface and the sign of the scaler indicates whether the voxel is inside or outside of the object (in this paper, voxels inside the object are negative, and those outside are positive).

By describing a signed distance field as D(x), it is possible to define an object's surface as the isosurface satisfying D(x)=0. In order to express the distance from a voxel to the object's surface, although there exist several problems for accuracy of hole-filling process, we adopt the line-of-sight distance instead of the Euclidean distance. This is because it can be calculated extremely fast by using general graphics hardware, and most problems of hole-filling process can be resolved by our proposed method.

Specifically, the signed distance between voxel and the shape data is calculated by, first, transforming the distance image's coordinate system from the object coordinate system to the camera coordinate system by using the camera parameter.

Then, the distance between the viewpoint of the distance image and voxel is calculated (Voxel Distance). At the same time, the distance between the viewpoint of the distance image and the shape data is also calculated (Image Distance). Finally, by calculating the difference between Voxel Distance and Image Distance, the signed distance can be calculated.

Step S12: Integration of the Signed Distance Fields

In this step, signed distance fields of plurality of 3-dimensional data are integrated.

Several methods are proposed to construct a signed distance field by integrating multiple 3D shape data. In this step, the signed distance value D(v) for a voxel v is calculated by accumulating the signed distances from each of the distance images, $d1(_v)$, $d2(_v)$, $dn(_v)$, each multiplied by a weight wi(v). Thus, integrated signed distance field can be obtained with the following formula.

[Equation 1]

$$D(v) = \sum_i d_i(v) w_i(v) \quad (1)$$

The weights wi(v) represent the accuracy of each distance value, and are often decided according to the angles between the directions of the line-of-sight from the camera and the directions of the normal-direction vectors of the surface. When the absolute value of di(v) is above a given threshold, since the voxel exists far away from the surface of distance image, it is preferable not to be accumulated.

It is also possible to simply add all the signed distances calculated from each distance image without using weight for the purpose of integration of signed distances.

Step S13: Classification of Voxels

In this step, each voxel is classified by referring to the signed distance calculated from each shape data (distance image).

Figure 3:
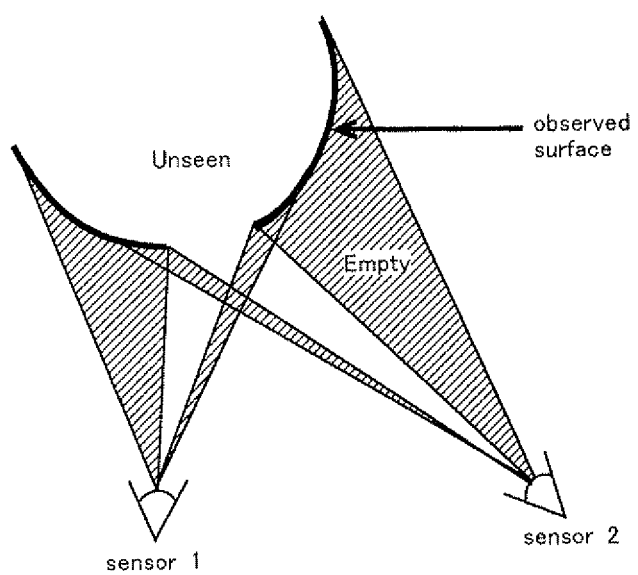
FIG. 3 The figure illustrates the interpolation by Space Curving method.

In the [Non Patent Literature 1], all the voxels in volume space are divided into one of the three types as shown in FIG. 3: Empty (outside the object), NearSurface (near the surface of the object) and Unseen (not observed, and thus, cannot be classified neither inside or outside of the object). Shape interpolation is then performed by generating a mesh over the border between Unseen and Empty voxels.

Here, it is more preferable to classify voxel into Solid (inside the object) by using, for example, magnetic resonance imaging (MRI) or computed tomography (CT), because Unseen area can be reduced.

One problem with this method is that all the voxels in the following three cases are classified as Unseen and these are not distinguished in the method.

(1) voxels outside the object, that do not exist on any line of-sight to an observed region in the distance images,
(2) voxels outside the object that exist BEHIND a surface of a distance image (occluded voxels outside the object),
(3) voxels inside the object.

In the invention, such problem is solved by classifying each Unseen voxel as either outside or inside of the objects by using a discriminant function which is defined in STEP S14.

Figure 4:
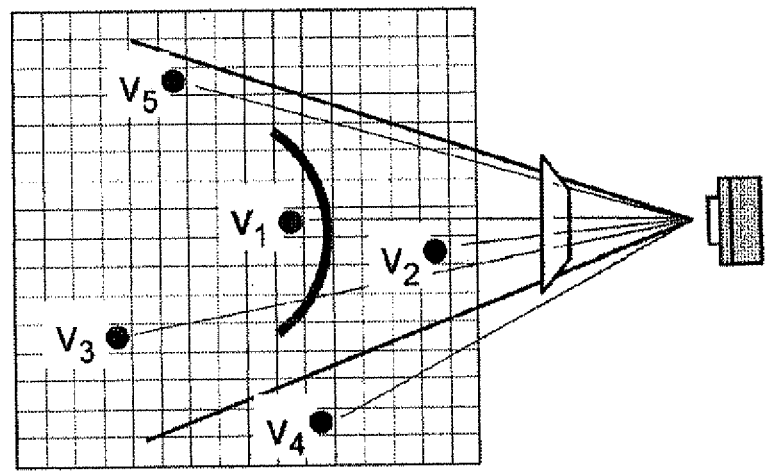
FIG. 4 The figure illustrates the explanation of voxel class of the invention.

We now describe the classification of voxels according to the proposed method using FIG. 4. For a given voxel, the definitive information obtained from a distance image whether it is inside or outside takes one of the following two types.

NearSurface (near the surface): The absolute value of the signed distance is below the assigned threshold, the voxel in question is classified as "near the surface", and the signed distance is retained (case of v1 in FIG. 4). In this case, it can be concluded that the voxel exists near surface.

Empty (outside the object): The absolute value of the signed distance is larger than the threshold and the sign is positive. The voxel in question exists between the object and the camera, so the voxel can be classified as "outside the object" (v4 in FIG. 4).

When merging multiple distance images, the information obtained from each distance image regarding voxels may differ. In such cases, if there is at least one distance image which classified as NearSurface, the voxel is also classified as NearSurface. Otherwise, if there is at least one distance image which classified as Empty, the voxel is classified as Empty.

If a voxel is classified into one of the two types described above, voxel can be deterministically concluded whether it is inside or outside of the object, however, if a voxel is neither of two types, it cannot be deterministically concluded whether it is inside or outside. In such case, it is estimated whether the voxel is inside or outside of the object according to the discriminant function defined in the nest STEP S14.

In this step, as described above, classifying voxels to be inside or outside of the object is achieved by the signed distance, however, it is also possible to conduct classification by using shape data as an input.

Step S14: Estimation of Voxel Class

Even if it cannot be determined definitely whether the voxel is inside or outside of the object by STEP S13, the following information can be acquired from the signed distance between voxel and the distance image.

Occluded (occluded region): The absolute value of the signed distance is larger than the threshold and the sign is negative. It is not possible to assert unconditionally whether the voxel is inside or outside the object. In this case, the classification of the voxel in question is temporarily set to Occluded. Whether the voxel is inside or outside is estimated afterwards (v3 in FIG. 4).

NoData (deficient data): The signed distance value cannot be obtained due to missing data in the distance images. It cannot be judged whether the voxel is inside or outside. In this case, the classification of the voxel is temporarily set to NoData. Whether the voxel is inside or outside is estimated afterwards (v5 in FIG. 4).

The case of v4 in FIG. 4, when the voxel in question is outside the angle of view of the distance image, may be handled as either Empty or NoData according to the application. For many applications, the voxels outside the field of view can be treated as Empty, but in cases such as zooming and measuring a large object, it is better to be treated as NoData.

When the information from distance images is only Occluded or NoData, it cannot be determined whether the voxel is inside or outside of the object. For such voxel, it is estimated whether the voxel is inside or outside of the object according to the discriminant function defined in the following. The voxels estimated as outside of the object are classified as Empty and the voxels estimated as inside of the object are classified as Solid (inside of the object). In the following, to achieve such estimation, the function defined by Bayes estimation using a normal distribution is described as the discriminant function.

We consider scalar values that are positive outside the object and negative inside the object, and we estimate the probability distributions of these values based on Bayes estimation. The subjective probability distribution when there is no data is considered to be a uniform distribution. Based on the posterior probabilities obtained from the data calculated from each distance image, the subjective probability distributions are updated according to Bayes theory. In terms of Bayes estimation using a normal distribution, the model distributions are often represented by normal distributions N(mu, sigma) where the mean value mu is same as the observation and the standard deviation sigma is reciprocal to the observation. In this invention, a heuristics whether the voxel is inside or outside is represented by the same idea. Specifically, a heuristics for assigning the voxel to Inside or Outside is represented by a sign of the mean value mu, and the degree of confidence in the heuristics is represented by the standard deviation 1/sigma.

When the voxel in question is Occluded in a given distance image, the voxel is behind the surface from the viewpoint. When the absolute value of the distance from the surface of the voxel (expressed as Dist) is relatively small, the confidence that the voxel is inside the object is high. Inversely, when it is far from the surface (Dist is large), the confidence that it is inside the object is low. As heuristics for these cases, we set the degree of confidence that the voxel is inside to 1/Dist, thus the corresponding posterior distribution becomes N(−1, Dist).

When the voxel in question is NoData for a given distance image, it may be either an outside voxel or an unobserved voxel inside the object. For actual cases, pixels of NoData in the distance images often indicate outside regions. From this heuristics, a constant value is assigned to the degree of confidence that the voxel is outside, thus the posterior distribution corresponding to NoData is represented as N(1, Const), where Const is a user-defined parameter. According to experiments, reasonable results can be obtained by setting Const to a value near the smallest thickness of the object.

In Bayes estimation using a normal distribution, the prior distribution N(mu, sigma) is updated using the posterior distribution N(mu_h, sigma_h) as follows.

[Equation 2]

$$\mu \leftarrow \frac{\sigma_h \mu + \sigma \mu_h}{\sigma + \sigma_h}, \sigma \leftarrow \frac{1}{\frac{1}{\sigma} + \frac{1}{\sigma_h}} \quad (2)$$

After performing this for all the distance images, a voxel is classified as Outside if the sign of the mean value mu of the final probability distribution is positive, and Inside if it is negative. Since the specific shape of the final mu can be calculated by using the fact that mu_h is either 1 or −1, it can be regarded as the discriminant function C(v) for voxel v. Thus, whether the voxel is inside or outside of the object can be judged according to the sign of C(v). Actual C(v) can be described as follows.

[Equation 3]

$$c_i(v) = \begin{cases} -1/|d_i(v)| & \text{if } Occ(i, v) \\ 1/Const & \text{if } Nod(i, v) \end{cases} \quad (3)$$

[Equation 4]

$$C(v) = \sum_i c_i(v) \quad (4)$$

where Occ(i, v) and Nod(i, v) mean that the information for the voxel v obtained from the distance image i is Occluded or NoData, and di(v) is the signed line-of-sight distance between the voxel v and the surface of the distance image i.

By executing the above steps, integrated shape that are classified (each voxel is labeled to be inside or outside of the objects) is obtained.

The discriminant function described above can be calculated only for voxels that are classified not to be Empty (outside the object) nor NearSurface (near the surfaces) from the signed distances. However the function can be calculated for all the voxels. In the third embodiment of the invention which is described later, the discriminant function is calculated for all the voxels regardless of values of the signed distances. This is preferable for GPU implementation where all the voxel are processed equally in parallel.

Another type of discriminant function can be used, instead of the one described above which are based on Bayes estimation. For example, voxels can be determined to be inside or outside simply using the distances from a fixed point. The inputs for calculating the discriminant function can be either signed distances as above, or shape information.

Step S15: Voxel Class Determination

In this step, by using the classification of voxels of STEP S13 and the estimation of voxel class by STEP S14, all the voxels are classified into either Inside, Outside or Near-Surface of the object. For the process, priority is given to the classification of voxels of STEP S13 over the estimation result by STEP S14. For example, the voxels which are classified as Empty (outside the object) and Near-Surface (near the surface) by STEP S13 are concluded as Empty (outside the object) and Near-Surface (near the surface) without change, and the rests of the voxels are determined as Empty (outside the object) and Solid (inside the object) by discriminant function of STEP S14. By applying the process to all the voxels, all the voxel classes within volume are classified into the three types: Solid (inside the object), Near-Surface (near the surface), and Empty (outside the object).

By the described steps, the integrated shape can be obtained as Nearsurface (near the surface), and borders between Solid (inside the object) and Empty (outside the object). Extracting borders between Solid (inside the object) and Empty (outside the object) can be achieved by searching Solid voxels that are next to Empty voxels, or by searching Empty voxels that are next to Solid voxels.

More precise polygon meshes can be generated by calculating signed distances for the NearSurface (near the surfaces) voxels and generating isosurfaces as in Step S16 described later. To achieve this, normal signed distance field (integrated signed distance) are assigned to memories for voxels of Near-Surface, a negative fixed value is assigned for voxels of Solid, a positive fixed value is assigned for voxels of Empty, where absolute values of the negative and positive fixed values are the same.

Step S16: Generation of Isosurface

In this step, by generating the isosurface of the constructed signed distance field, integrated polygon mesh is created. In the integrated signed distance field D(x), the isosurface satisfying D(x)=0 represents the integrated shape. In order to generate the mesh model of the integrated result, the Marching cubes method [Non Patent Literature 9] can be used.

The above steps for each locations can be performed sequentially for all the voxels. Those steps can also be repeated independently for all the voxels.

In addition, since only small parts in the entire volume space are related to the isosurface, the processing cost can be reduced by first computing the signed distance field in a coarse resolution (the first resolution), and performing the same computation in the higher resolution (the second resolution) for only the voxels determined to be near the isosurfaces in the coarse resolution (i.e. the voxels in the regions of either NearSurface or the boundary between the Inside and Outside). In the experiments described in <Fifth embodiment>, this kind of coarse-to-fine technique is implemented to reduce the computational cost and time.

<Application for Active Stereo Method>

Active stereo methods, in which the light sources are used as well as the camera, are representative examples of techniques for obtaining dense 3D shapes. In these methods, the occlusion of light sources causes missing data, but when data is measured at a point, it proves that the voxels between the point and the light source are outside of the object.

Figure 5:
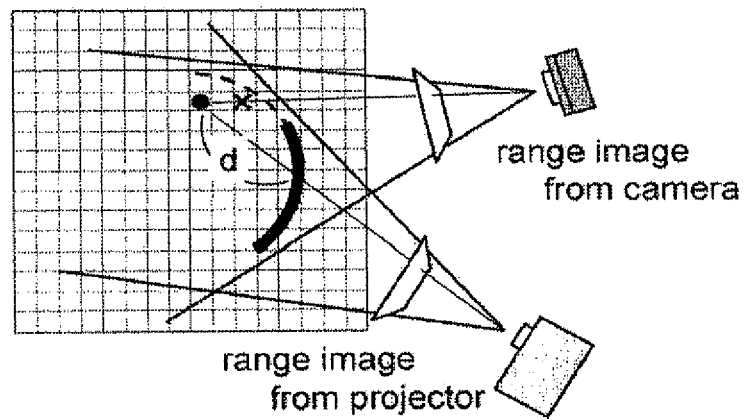
FIG. 5 The figure illustrates the explanation of active stereo method.

In this method, we utilize the position of light sources in an active stereo system by using additional distance images from virtual cameras located at the light sources. For each of the measurement, we consider using two distance images, from both the camera and the light source position (described below as the camera distance image, and light source distance image). In the case shown in FIG. 5, the distance data from the camera distance image is missing for the position where the data is missing in the camera distance image because the light from the light source is occluded. However, by referring to the light source distance image, the line-of-sight distance from the light source position to the voxel may be obtained. In addition, even if a voxel position is not obtained, by using light source distance images, the number of voxels that can be classified as NearSurface or Outside increases and it is possible to achieve more accurate estimation for voxel classification.

The light source distance image can be generated by projecting the 3D positions of all the pixels of the camera distance image onto the virtual camera at the light source position.

The voxel types are almost same as when using the camera distance images alone, but the order of priority for the voxel classifications is set to NearSurface in the camera distance image, NearSurface in the light source distance image, Empty in the camera distance image, followed by Empty in the light source distance image. The discriminant function C(v) for voxel classification that utilizes the positions of the light sources is extended from equation (4) and described as follows.

[Equation 5]

$$c_i(v) = \begin{cases} \frac{-1}{|d_i^c(v)|} + \frac{-1}{|d_i^l(v)|} & \text{if } Occ^c(i,v) \wedge Occ^l(i,v) \\ -1/|d_i^c(v)| & \text{if } Occ^c(i,v) \wedge Nod^l(i,v) \\ -1/|d_i^l(v)| & \text{if } Nod^c(i,v) \wedge Occ^l(i,v) \\ 1/Const & \text{if } Nod^c(i,v) \wedge Nod^l(i,v) \end{cases} \quad (5)$$

[Equation 6]

$$C(v) = \sum_i c_i(v) \quad (6)$$

where the superscript symbols c and l of Occ, Nod, di(v) mean the camera distance images and light source distance images, respectively.

Third Embodiment

Utilization of GPU for Classification Process

In this embodiment, shape integration process including classification step whether voxel is inside or outside using discriminant function described above utilizing GPU is explained. Especially, within the process, utilization of GPU on calculation of signed distance will be explained in detail in the fourth embodiment later.

The abovementioned merging and interpolation algorithms can be executed efficiently by utilizing a GPU. Since GPUs can only output 2D images, the volume of the signed distance field is calculated slice by slice. The signed distance value D(v) and discriminant function value C(v) are calculated by rendering each slice in a frame buffer.

Rendering is performed by multi-pass rendering using programmable shaders. Each pass is a rendering for each distance image and results are added to the frame buffer by using blending functions. When performing the rendering of the i-th pass, the i-th camera distance image (distance image i), and the light source distance image that corresponds to the distance image i are used for the input. The input images are accessed as floating point textures. Rendering of each pass is executed by issuing graphics instructions to draw a single rectangular polygon on entire frame buffer. The polygons are rasterized into pixels and the pixel shader program processes each of the pixels. The pixel shader calculates di(v), wi(v) and ci(v) using the input data of distance image and the position of a voxel v, and then, add the results to the frame buffer.

This process is repeated for all the input scanned data, changing the textures of the camera distance images and the light source distance images. Finally, the frame buffer holding the weighted sum of signed distances D(v) and the values of C(v) is read back into the main memories. Then, the signed distance and the discriminant function values are combined and a slice of the signed distance field is calculated.

The actual calculation in the pixel shader for distance image i is as follows. In the process, a four-channel RGBA (Red, Green, Blue and Alpha) frame buffer is used, and channel R is assigned to D(v), G is assigned to a flag expressing NearSurface, B is assigned to C(v), and A is assigned to a flag expressing Empty. By this implementation, taking an advantage of extremely fast computation of 2-dimensional information on GPU, calculation time of signed distance field and discriminant function can be drastically reduced.

The actual process is as follows and signed distance field and discriminant function are calculated at each steps. Here, both camera distance images and light source distance images acquired by active stereo method are used as input shape data.

Input: Voxel position v, camera parameters Pci, parameters of the virtual camera of the light source position Pli, texture for the camera distance image Rci, and texture for the light source distance image Rli.

Step 1: The points projected from v using Pci and Pli are calculated as xci(v) and xli(v).

Step 2: The distances from the camera and light source, rci(v) and rli(v) are sampled as Rci(xci(v)) and Rli(xli(v)).

Step 3: If rci(v) is not a missing value, then the signed distance from the camera viewpoint dci(v) (line-of-sight distance) is calculated. Likewise, if rli(v) is not a missing value, then the signed distance from the light source viewpoint dli(v) (line-of-sight distance) is calculated.

Step 4: dci(v) or dli(v) is calculated, and if either of their absolute values is beneath the threshold value (the NearSurface case), then depending on which of dci(v) and dli(v) is available, a pixel value of (dci(v),1,0,0) or (dli(v),1,0,0) is returned. dci(v) or dli(v) is calculated, and if both of the absolute values are above the threshold (the Empty case) the pixel value (0, 0, 0, 1) is returned.

Step 5: Performing a case analysis based on the loss of rci(v) or rli(v), a pixel value of (0, 0, ci(v), 0) is returned.

Regarding the contents of the frame buffer after rendering, the case that G>0 corresponds to NearSurface so the value of R(D(v)) is taken as the signed distance, and the case that G=0 and A>0 corresponds to Empty so a value for outside of the object is assigned. When G=0 and A=0, the inside and outside of the object is judged based on the value of B(C(v)), and the value for Inside or Outside is assigned accordingly. For calculation of the weighted sum of the signed distances, it can be implemented efficiently by pre-calculating the weight for each pixel in the distance image and treating them as textures.

Fourth Embodiment

Calculation of Signed Distance Field Using GPU

In the embodiment, a method of calculating a signed distance field using a GPU (graphics processing unit) is described. In the aforementioned third embodiment, the merging of the shape data including the step of estimating inside and outside of the voxels by using the discriminant function is described. However, in the embodiment, an image processing apparatus and image processing method of calculating signed distances by using a GPU without performing the classification and determination of the voxels are described.

Figure 6:
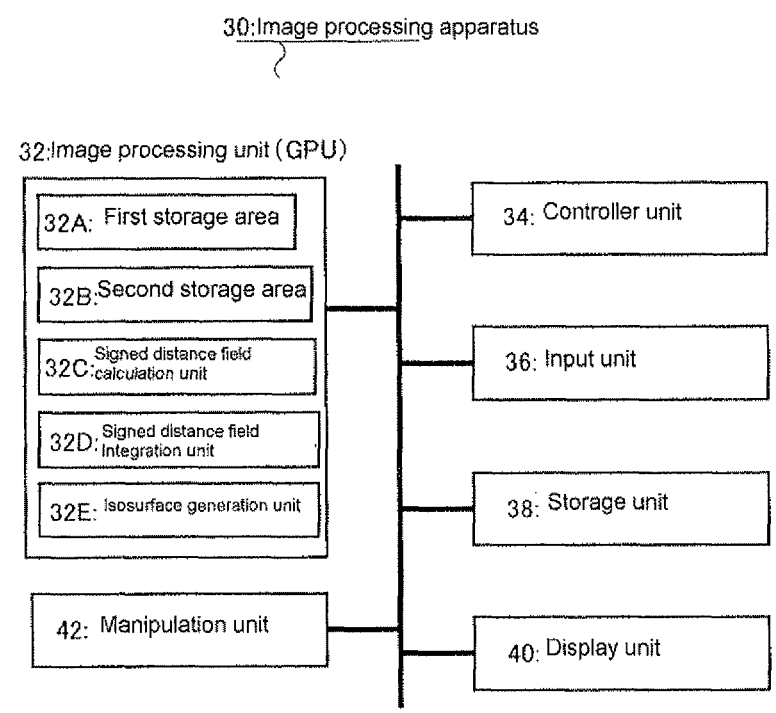
FIG. 6 The figure illustrates the image processing apparatus of the invention.

Referring to FIG. 6, the image processing apparatus 30 according to the embodiment mainly includes an image processing unit 32 constructed with a GPU, a control unit 34, an input unit 36, a storage unit 38, a display unit 40, and a manipulation unit 42. Herein, the detailed configurations of the control unit 34, the input unit 36, the storage unit 38, the display unit 40, and the manipulation unit 42 are the same as those shown in FIG. 1. The characteristic point of the image processing apparatus 30 is that the image processing unit 32 including a signed distance field calculation unit 32A or the like is implemented by the GPU.

The image processing unit 32 constructed with the GPU is configured to include a first storage area 32A, a second storage area 32B, a signed distance calculation unit 32C (first calculation unit), a signed distance merging unit 32D (second calculation unit), and an isosurface formation unit 32E.

The first storage area 32A and the second storage area 32B are constructed with semiconductor memories that are included inside the GPU. The first storage area 32A is a texture area, in which the distance image, that is, the input shape data is stored. When the signed distance of the shape data is calculated, the distance image data stored in the first storage area 32A is read. The second storage area 32B is an area for storing a value of a voxel.

The signed distance calculation unit 32C is a portion of the calculation function of the GPU. The signed distance calculation unit 32C calculates signed distances between the 3-D positions which represent the voxels and are stored in the second storage area 32B and the shape data which are stored in the first storage area 32A. A shader that may be included in the GPU may be used as the signed distance calculation unit 32C.

The signed distance merging unit 32D is a portion of the calculation function of the GPU. The signed distance merging unit 32D has a function of merging the signed distance calculated by the signed distance calculation unit 32C. As the signed distance merging unit 32D, a blending function included in the GPU may be used. The data of the signed distance integrated by the unit is stored in the second storage area 32B.

The isosurface generation unit 32E forms the isosurface based on a value of the signed distance integrated by the signed distance merging unit and extracts the result of merging as a mesh model.

Figure 7:
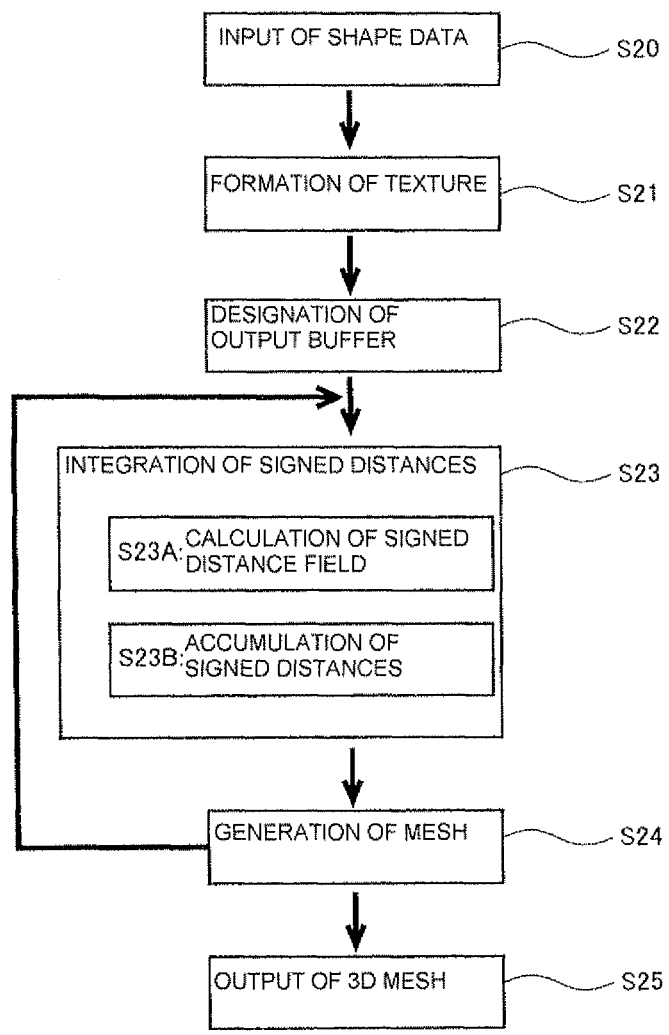
FIG. 7 The figure illustrates the flowchart of image processing method of the invention.

In addition, referring to FIG. 7, an image processing method according to the embodiment includes: a step S20 of inputting shape data; a step S21 of generating a texture from input shape data; a step S22 of designating an output buffer; a step S23 of merging signed distances; a step S24 of generating a mesh model based on the integrated signed distance; and a step S25 of outputting a 3-D mesh. Herein, the step S23 includes a step S23A (first step) of outputting the signed distances and a step S23B (second step) of adding (merging) the calculated signed distances. In addition, in the embodiment, the step S23 and the step S24 are sequentially performed on every volume slice of a 3-D space. Hereinafter, these steps are described in detail.

Step S20: Input of Shape Data

In the step, a plurality of shape data is input. Herein, the shape data is acquired, for example, by the process of the step S10 of the aforementioned second embodiment. The input shape data is of a format of distance image.

Step S21: Formation of Texture

In the step, a distance image texture and a weighted texture are generated.

First, since the calculation is performed by using the GPU, the process for transforming the distance image into the texture and the process for generating the weighted image texture used to calculate the weighted portion of the aforementioned Equation (1) in advance are described.

In order to process the image on the GPU, the distance image needs to be transformed into the texture (distance image texture).

Although the distance image used in the embodiment have a signed distance field provided to the pixel values, all the pixels are not provided with the distance values, but there are lost portions where the distance values are not defined. In the case where sub pixels of the distance image are sampled, the signed distance field can be calculated by using linear interpolation of the distance values of adjacent pixels. In the case where the distance value of the adjacent pixel is lost, the value of the sampled sub pixel may be lost.

In this manner, since the distance values and the lost states are represented by the distance image texture on the GPU and efficiently processed, the texture is generated as follows.

First, a floating-point-valued texture of luminance and alpha is generated, and a floating-point-valued luminance/alpha texture having a distance value in a luminance channel and a loss state (0=loss, 1=no loss) in an alpha channel is generated.

If the texture is used, and if the sub pixel is sampled by the linear interpolation, in the case where the value of the loss channel (alpha channel) of the adjacent pixel is 1 (no loss), the value of the distance value channel (luminance channel) becomes the distance value. If the value of the loss channel is not 1, it is determined that any one (one or more) of the adjacent pixels is lost. Due to the generation of the distance image texture, the distance value can be obtained at a high speed on the GPU.

Next, the weighted image texture is generated. In the calculation of the aforementioned Equation (1), the weighting of the signed distance field is needed. In the embodiment, in order to calculate the weighting factor on the GPU, a method of generating texture in which the weighting factor is stored is described.

The weighting factor of the signed distance field can be calculated from the distance image. More specifically, a view-direction weighting factor of each of the pixels of the distance image as viewed from a camera can be calculated. In addition, a normal-direction weighting factor from the vicinity of each of the pixels including the adjacent pixels can be calculated. In the case where the normal-direction weighting factor at the position of the pixel p of the distance image having index i is denoted by $N(p)$ and the view-direction weighting factor is denoted by $V(p)$, the weighting factor becomes an inner product of the normal-direction and view-direction weighting factors, that is, $N(p)*V(p)$. The weighting factors $wi(p)=N(p)*V(p)$ are calculated with respect to all the pixels p of the distance image, so that the weighted image is generated. However, in the case where the pixel p of the distance image is lost, since the weighting factor thereof is not used, a non-defined value may be used. In a real case where the texture is used, although there is the loss state similarly to the aforementioned distance image texture, the sub pixel in the loss state is located at the same position as that in the distance image texture. Therefore, since the weighted image is used together with the distance image texture, there is no need to provide the loss state to the alpha channel or the like.

In the embodiment, since the calculation of the weighting factor is not included in the GPU, the calculation is performed by a CPU in advance. The reason that the weighted image is calculated in advance is to efficiently increase the processing speed. Although the weighting factor of the voxel position v on the pixel shader of the GPU may be calculated by using only the distance image as the texture data, in this case, texels corresponding to the distance image and adjacent texels for obtaining a direction of a plane are needed, so that calculation load is increased.

In addition, in the embodiment, the texture representing the weighting is generated in separation of the texture of the distance image. However, the information on the weighting may be provided to the distance image texture by inputting the weighting factors in the alpha channel of the distance image. In this case, the loss state may be represented by storing a specific numeric value in the alpha channel.

Step S22: Designation of Output Buffer

Next, a slice texture of a 3-D space volume is generated and designated as an output buffer. The signed distance field is calculated in units of a volume slice by using the GPU. As described above, the GPU stores a calculation result in a 2-D image called as a frame buffer. In general, a result of calculation performed on the frame buffer is first rendered on a screen, and, then, displayed on a monitor. However, in the embodiment, the volume slice needs not to be displayed on the monitor. Since the GPU has an RTT (render to texture) function, in which writing into the frame buffer is replaced with writing into the texture, the volume slice can be generated as the texture by using the function.

Step S23: Integration of Signed Distances

In this step, the signed distances are calculated from the distance images by using the function of the GPU (step S23A), and the calculated signed distances are added (step S23B). More specifically, in this step, the image distance texture is replaced with the weighted texture, and rendering is repetitively performed on all the slice textures. Herein, the step S23A of calculating the signed distances is performed by using the shader of the GPU. In addition, the step S23B of adding the signed distances is performed by using the blending function of the GPU.

Figure 8:
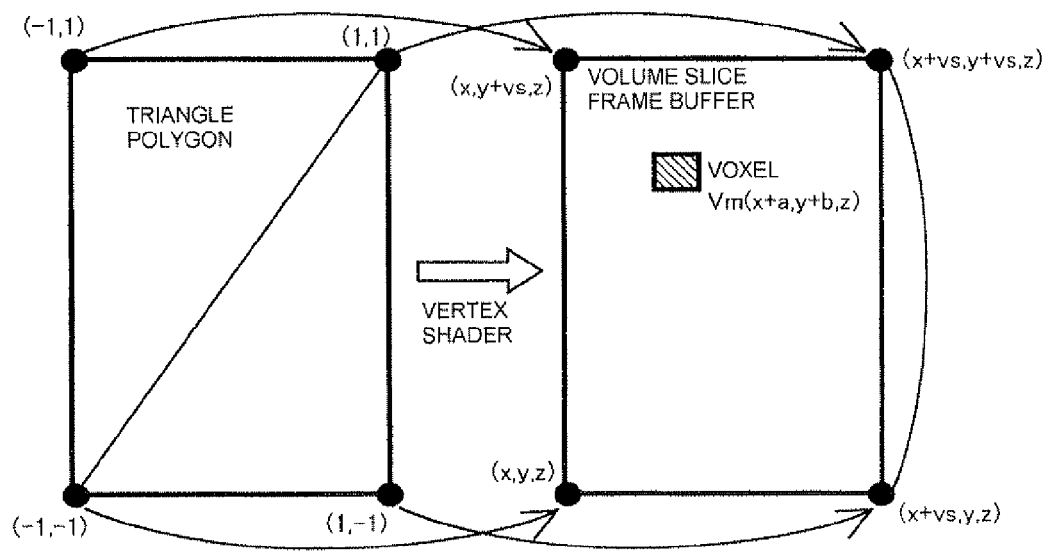
FIG. 8 The figure illustrates the rendering step on volume slice.

As shown in FIG. 8, the GPU performs the rendering of a triangular polygon on the frame buffer. Since the frame buffer is treated so that it is equivalent to the volume slice, one-time calculation needs to be performed on each voxel of the volume slice. Although not simple, a square polygon having vertexes (−1,−1), (1,−1), (−1,1), and (1,1) is input, and various parameters (model, view, projection matrix, view-port, and the like) are set so that the entire frame buffer is rendered by the square polygon. In this manner, the rendering on the frame buffer is performed.

In this embodiment, the volume slice is assumed to be a square. However, in the case where the volume area is rectangular, the volume slice may be a rectangle.

In addition, in this embodiment, the signed distance field on the entire volume slices is obtained by issuing a command of rendering a single polygon to the entire frame buffer. However, the signed distance field of only a portion of the frame buffer may be obtained by issuing a command of rendering a smaller polygon.

In addition, instead of issuing the command of rendering a single shape to the entire area where the signed distance field is to be obtained, the area is divided into multiple small shapes, and the rendering is performed on a group of the small shapes. A vertex shader has an action on all the vertexes of the small shapes, so that a portion of the process of the pixel shader may be replaced with the vertex shader.

Although the vertex shader calculates transformation of each vertex of the rectangular polygon, since the slice positions v in the volume space are needed, the slice positions v need to be calculated by the vertex shader and to be transferred to the pixel shader. The slice positions v are interpolated from the vertices on the pixel shader, so that the values of the slice positions v on each pixel shader becomes the position of the voxel that is to be calculated by the pixel shader.

In the case of a volume having one side length as vs, the generating position of the volume is changed from (xs, ys, zs) to (xs+vs, ys+vs, zs+vs), with respect to a slice on the xy plane at a position z in the z axis, the position (xv, yv, zv) on the volume can be calculated from the vertices (xp, yp) of the rectangular polygon by using the following equation.

[Equation 7]

$$(x_v, y_v, z_v) = \left(x_s + vs \times \left(\frac{x_p+1}{2}\right), y_s + vs \times \left(\frac{y_p+1}{2}\right), z\right) \quad (7)$$

The rendering of volume in units of a slice on the GPU can be performed by the aforementioned calculation. However, since the to-be-rendered slice of volume needs to be represented by the texture, the channels of the pixels of the volume slice need to be determined. In this embodiment, unlike a texture which is used for general texture mapping, the signed distance field needs to be stored. In addition, since the signed distance field needs to be represented with a floating-point number (real number), a floating-point number (real number) texture is used. In addition, there is needed a flag for determining whether or not the signed distance field is lost.

In the embodiment, luminance is used for the channel storing the signed distance field; alpha is used for the channel storing the loss flag; and each channel is configured by using 32-bit floating-point number (real number). With respect to the loss flag, the alpha value 0 denotes the loss state, and the other cases denote the no-loss states.

Next, writing of the frame buffer into the texture is performed. In order to use this function for OpenGL, there may be used a method of using pbuffer or EXT frame buffer object extension. The case of using the pbuffer is implemented by generating a buffer called the pbuffer and designating the buffer so as to perform the rendering. The case of using the EXT frame buffer object extension can be easily implemented without a process depending on OS, unlike the pbuffer in which the process depending on OS is needed.

In the embodiment, if any one of these functions is used, no problem occurs. Therefore, there is used the EXT frame buffer object, which can be easily implemented and has high extensibility without depending on the pixel format.

Step S23A: Calculation of Signed Distance Field

In this step, the signed distance field with respect to the slice is calculated from a single distance image by using the GPU.

First, with respect to the vertex processed by the vertex shader, the shading calculation is performed on each of corresponding pixels on the frame buffer by rasterization. As shown in FIG. 8, with respect to the slice, the calculation of the pixel shader is performed on the entire frame buffer (volume slice) by using the rasterization. In the case where a single distance image having an index i is input, the equation of the calculation of the signed distance field of each of the voxels v can be simplified by the following equation.

[Equation 8]

$$D(v) = d_i(v) w_i(v) \quad (8)$$

In order to perform the calculation, the following values need to be prepared in advance. First, a distance image, camera parameters of a camera photographing the distance image (internal parameters, external parameters, or both thereof), a weighted image containing a weighting factors, and a threshold value for limiting a range of the signed distance field are needed. The weighted image containing the weighting factor is needed. The method of calculating the weighting factor is the same as those described above.

The calculation algorithm of the pixel shader (GPU) is performed as follows.

Input Value: voxel position v (v is an output of the aforementioned vertex shader)

Step 1: The position p in the distance image space of v is calculated from the camera parameters.

Step 2: The texel of the position P in the distance image is sampled. The texel is a distance from the starting point to the shape of the object in a direction toward the voxel v and is denoted by length v.

Step 3: In the case where there is a loss in the length v, the calculation of the pixel shader is discarded and ended.

Step 4: A difference between a distance between the pixel and the viewpoint and a distance of the length v is calculated and denoted by a signed distance field di(v).

Step 5: In the case where the signed distance field di(v) exceeds a designated threshold, the calculation is discarded and ended.

Step 6: Similarly to the distance image, the weighting factor is calculated from the weighted image and is denoted by wi(v).

Step 7: As a result of the calculation of the pixel shader, the weighted distance values di(v) and wi(v) the loss flag of no-loss (1) are the return values.

By performing the step hereinbefore, the signed distance field is calculated from the distance image.

In the embodiment, although the calculation of Step 1 is performed on the pixel shader, the calculation of the Step 1 may be performed on the vertex shader. In this case, the polygon or triangle rendered on the frame buffer is finely divided and the displaying command is issued, so that the Step 1 needs to be performed on a large number of vertexes.

Step S23B: Accumulation of Signed Distances

In the step, accumulation of the signed distances calculated in the aforementioned step is performed.

In the case of the single distance image, the signed distance can be simplified as shown in Equations (1) and (8). However, in the case of a plurality of the distance images, the weighted signed distance fields of each distance image having an index i need to be added to each other. Herein, as a method of adding the weighted signed distance fields by using the GPU, there are the following three methods.

(1) The slices of the signed distances calculated from the single distance image are generated with respect to the distance images and added to each other by using a CPU.

(2) All the distance images and the weighted images are simultaneously transferred as a texture to the pixel shader, and the calculation is performed at one time.

(3) The calculation of the signed distance field is performed on the frame buffer by using the blending function of the GPU.

In the method (1), the slice image needs to be generated with respect to each of the distance images, and the merging thereof needs to be performed by using a CPU of which the processing speed is lower than that of the GPU. Therefore, although the implementing thereof is simplified, there is a problem in that processing time and a memory amount used are increased. In the method (2), since the calculation can be performed at one time, the calculation can be advantageously performed at a high speed. However, there is a limitation in the number of the textures that are simultaneously used as the limitation of the GPU, and the two textures, that is, the texture representing the distance image and the texture representing the weighting are used for each of the distance images. Therefore, there is a problem in that only several distance images can be treated. In the method (3), the processes are the same as those of the method (1), but the calculation of the merging is performed on the frame buffer. Therefore, there is an advantage in that the process can be performed at a high speed by using the blending function of the GPU. In the embodiment, the method (3) is very suitable.

Figure 9:
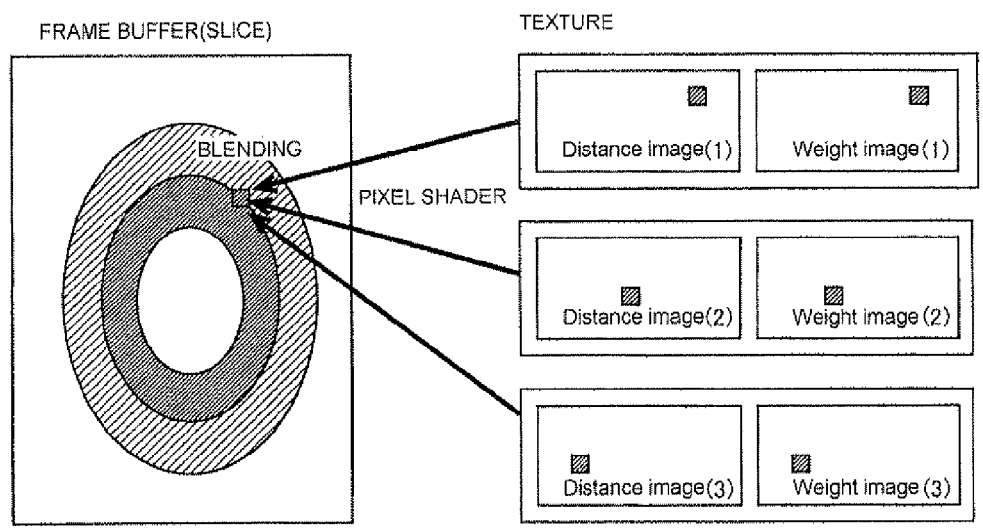
FIG. 9 The figure illustrates the integration of slices by using blending function on GPU.

The merging method of the blending using the GPU becomes the calculation method described in FIG. 9. The rendering is performed in units of a slice from one distance image and the weighted image, and the calculations result with respect to each pixel are added to each other by the addition using the blending.

The processes from the preparation of the volume slice texture to the rendering of the signed distance field to the volume slice are summarized as follows.

Step 1: The volume slice texture is generated (prepared); and the signed distance field is reset to 0 and the loss flag is reset to 0 (loss state).

Step 2: The rendering of the slice of the signed distance field in the frame buffer is performed from the distance image having an index i and the weighted image. By the rendering, the vertex shader and the pixel shader are operated in an inner processor of the GPU, so that the calculation of the signed distance is performed.

Step 3: In the slice subjected to the rendering, the addition of the signed distances is performed by the blending on the frame buffer.

Step 4: Details of the frame buffer (signed distance field data in the volume slice) are transmitted to a storage unit such as a main memory. If there is a next index i+1, it is set such that i=i+1, so that the process proceeds to Step 2. If not, the process is ended. By the repetition of the process, the signed distance fields on the entire volume data are calculated. At this time, only the last two slices are maintained in the storage unit of the GPU, and this step is repeated. In the method (the following method) of Step S24, the isosurface between the two slices is generated, so that a storage capacity of the storage unit can be greatly reduced.

In the above description, the method of sequentially generating the isosurface by repeating the above process while moving on the volume slice in the Step 4 is described. However, the signed distances may be calculated on the entire volume, and the isosurface may be generated. In this case, a large storage capacity is needed.

Step S24: Generation of Mesh

Next, an isosurface is generated from the signed distance field calculated in the aforementioned step. In other words, the conversion from the signed distance field to the mesh model is performed. A marching cubes method is used for the generation of the mesh from the signed distance field. If there is no loss in the signed distance field, the marching cubes method may be directly used. With respect to the calculation of the marching cubes method in the case where there is a loss, if there is a loss in any one of the signed distance fields of the eight voxels adjacent to a specific pixel, the shape may not be generated. Therefore, if there is a loss, the calculation of the marching cubes method may be skipped, so that the calculation speed may be slightly increased. In comparison of the cost for calculating the signed distance field and the cost for generating the mesh from the signed distance field by the marching cubes method, since most cost is the cost for calculating the signed distance field, the marching cubes method can be directly used for the embodiment.

In the embodiment, the mesh between the last two slices is sequentially generated by the marching cubes method inside the repetitive loop of calculating the signed distance field with respect to the slices of the volume data. Therefore, there is no need to store the entire volume data in the storage unit, so that there is an advantage in that the use amount of the storage unit can be reduced.

More specifically, in the case where the signed distance field has a 3-D volume structure and the volume having a resolution N*N*N is simultaneously acquired in the memory, a resolution of N=1024 and a memory having 4 GB in units of 32 bit real number are needed for the signed distance field. In the current GPU, it is impossible to ensure the memory having such as capacity.

In the case where the marching cubes method is employed as the calculation method, only the eight signed distance fields around each pixel are needed at one-time process.

Therefore, in order to form a shape by performing the marching cubes method from the signed distance field, at least eight voxel areas are needed.

Since the GPU is specified to the calculation in the 2-D image, the calculation in units of a volume slice can be performed at a high speed. Therefore, in order to obtain eight adjacent voxels as slices, upper and lower slices including the voxel as an object may be sufficiently used. Therefore, the use amount of the memory can be reduced down to 2*N*N, and in the case where the resolution is N=1024 and the distance value is a 32 bit real number, the use amount of the memory becomes 8 MB. In comparison with the use amount of 4 GB, the use amount can be greatly reduced. The use amount of the memory is sufficiently included in the use amount of a general GPU.

In addition, the information on the 3-D mesh generated in the aforementioned steps are output and stored to a storage unit such as an HDD.

In this case, the calculation of the isosurface using the Marching cubes method may be performed by a geometry shader of the GPU.

Fifth Embodiment

Explanation of the Experiments

In order to demonstrate the effectiveness of the proposed method, experiments were conducted using two types of data. Firstly, synthetic data generated from an existing shape model (mesh data) were used. Seven distance images were generated from the shape model, while changing the position of the viewpoint. Since we assume the measurements using an active stereo method, the points on the surface where the light is self-occluded by the object were treated as missing data, even if they were visible from the camera. The second type of data was an actual object (an ornament in the shape of a boar) measured with an active stereo method using a camera and a projector. Measurements were conducted 8 times while moving the viewing position.

Each data set was integrated and a mesh model was generated using the SC method, the volumetric diffusion method (described as the VD method below), the method proposed by Sagawa et al. in which a "consensus" regarding signed distance fields from multiple distance images is calculated (written as the Consensus method below), and the proposed method (the information regarding the light source position for active stereo was used). In the SC method, the VD method, and the proposed method, the signed distance field is calculated using line-of-sight distance. In the Consensus method, however, the signed distance field is calculated using the Euclidean distance. In the VD method, the diffusion of the volume was repeated 30 times. Also, the size of the volume was set to 512*512*512. In order to achieve a speed up, the proposed method first performed processing with a resolution of 62*62*62, and rendering with the high resolution was only performed for the region where the surface exists in the low-resolution result. We performed experiments regarding the proposed method, applying a smoothing filter with a 3*3*3 size to the volume, and also without such a filter. The filter prevents aliasing occurring in the interpolated surface (the smoothing was not performed in the SC method or the VM method). The SC method, the VD method and the proposed method were executed on PC with an Intel Xeon (2.8 GHz) CPU, and an NVIDIA GeForce8800GTX GPU installed. The Consensus method was implemented on a PC constructed with 2 Opteron 275 (2.2 GHz) CPUs (a total of 4 CPUs).

Figure 13:
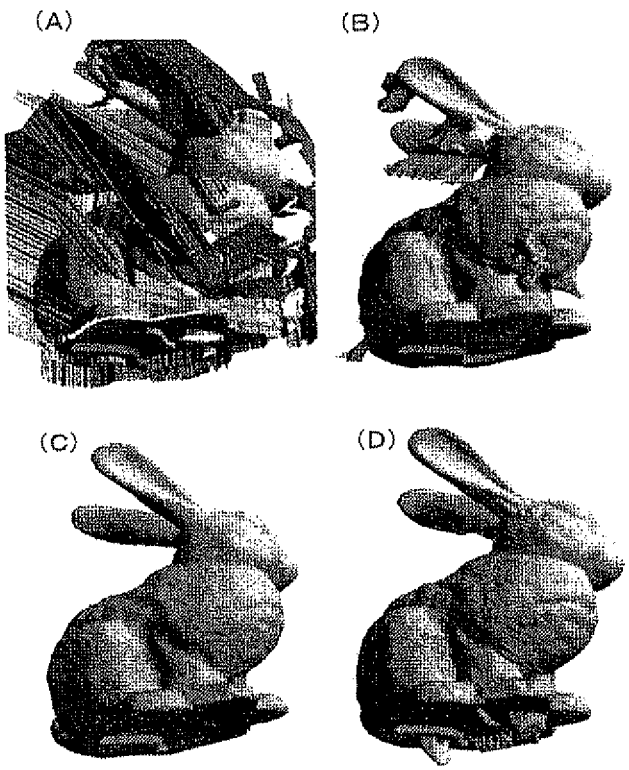
FIG. 13(A) to (D) illustrate the integration results with interpolation (synthetic data).
Figure 14:
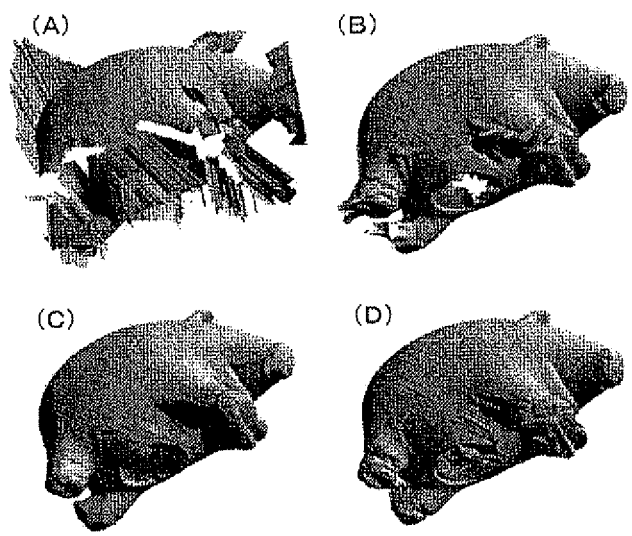
FIG. 14(A) to (D) illustrate the integration results with interpolation (real data).

The results of merging with no interpolation are shown in FIG. 12, and the results of the interpolation process with each method (for the proposed method, the case when smoothing was applied) are shown in FIGS. 13 and 14. Here, FIG. 12(A) is a synthetic data and FIG. 12(B) is a real data, and there is no interpolation method applied on both images. The execution time for FIG. 12(A) with volume resolution of 1024*1024*1024 is 1635 sec. for CPU and 142 sec. for GPU, respectively. Thus, we can confirm that the calculation time is significantly reduced by GPU processing.

FIG. 13(A) illustrates the result of SC method, FIG. 13(B) illustrates the result of VD method, FIG. 13(C) illustrates the result of Consensus method, and FIG. 13(D) illustrates the result of the embodiment of the present invention.

Further, each figure of FIG. 14 is as same as FIG. 13, and thus, FIG. 14(A) illustrates the result of SC method, FIG. 14(B) illustrates the result of VD method, FIG. 14(C) illustrates the result of Consensus method, and FIG. 14(D) illustrates the result of the present invention. Here, smoothing process is applied on the result in FIG. 13(D) and FIG. 14(D).

Figure 15:
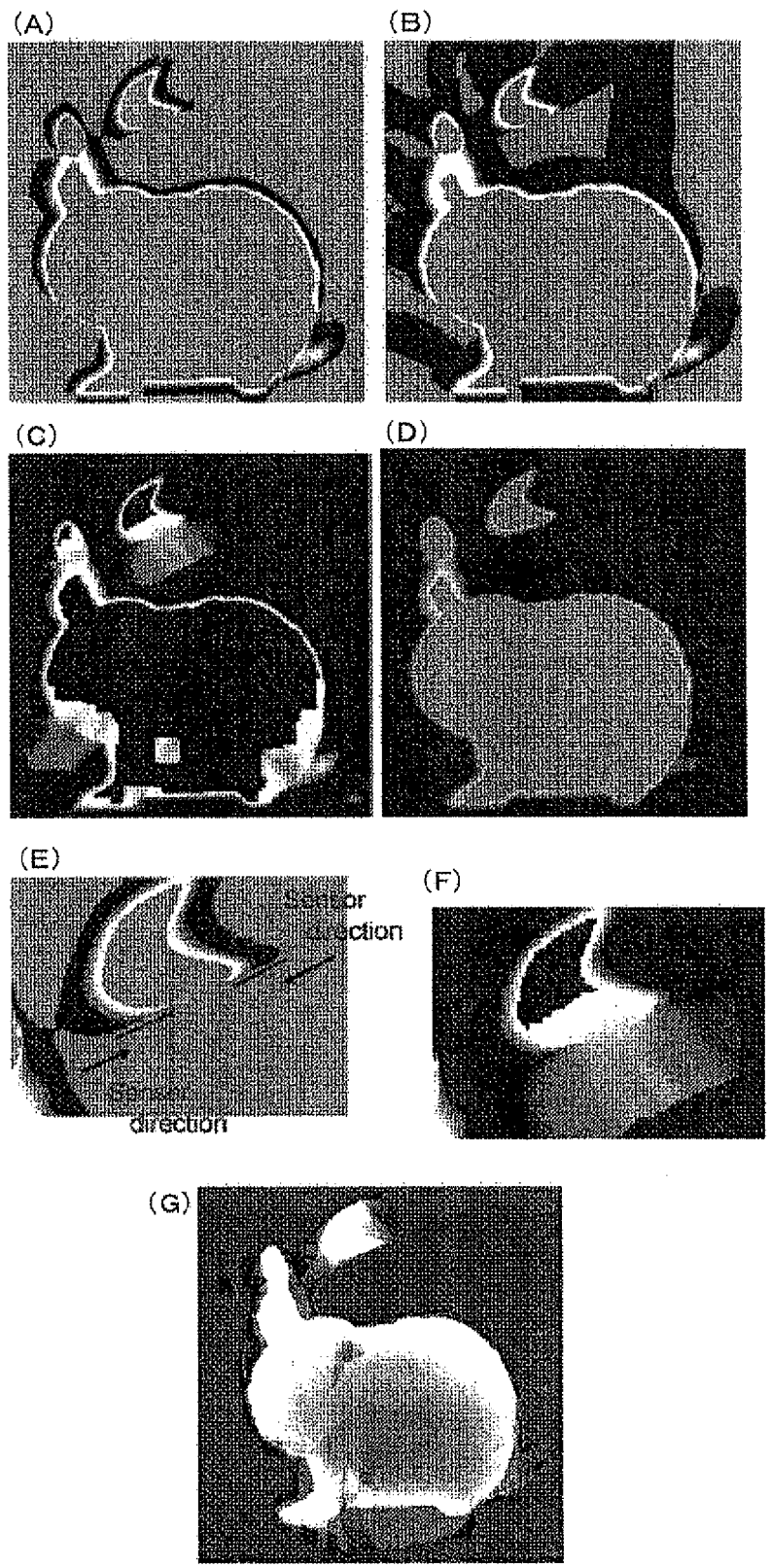
FIG. 15(A) to (F) illustrate the cutaway drawing of signed distance field and (G) illustrates the cutaway drawing of discriminant function.

Also, FIG. 15 shows the signed distance field and discriminant function C(v) for each experiments on the synthetic data sliced at a certain z-coordinate. Specifically, FIG. 15(A) illustrates the signed distance field without interpolation, FIG. 15(B) is by SC method, FIG. 15(C) is by VD method, FIG. 15(D) is by this invention, FIG. 15(E) is a close up view of the ear of FIG. 15(A), FIG. 15(F) is a close up view of the ear of FIG. 15(C), and FIG. 15(G) illustrates the discriminant function.

Now, we explain the color related to each figure of FIG. 15. In FIG. 15(A), FIG. 15(B) and FIG. 15(C), gray color represents Unseen, black color represents Empty and white color represents NearSurface. In FIG. 15(D), gray color represents inside of the object and black color represents outside of the object. In FIG. 15(G), bright gray color represents positive value of discriminant function and dark gray color represents negative value of discriminant function.

FIG. 13 (A) and FIG. 14 (A) show that excess meshes were produced surrounding the target object when using the SC method both for synthetic data, and the real data. This is because Unseen (not observed) regions remained without being carved in the signed distance field surrounding the object (the gray region outside the target object in FIG. 15(B)), yielding excess meshes between the Unseen and Empty parts. If the target object mesh and these meshes are separated, this kind of mesh can be pruned away. But, for the data used in the experiments, the excess meshes and the target object end up being connected, yielding the results shown in the figure.

FIG. 13(B) shows the hole in the bottom part of the rabbit statue was interpolated with the VD method. But beneath the ears and on the chest, the mesh surrounding the holes spread in undesirable directions. These phenomena often occurred where the normal-direction of the shape and the measurement direction (direction of the line of sight) are greatly different. In such regions, the borders between the NearSurface and Unseen regions (the dark gray line in FIG. 15(E)) were not parallel with the normal directions of the surface of the object as shown in FIG. 15(E). This caused the expansion of the isosurfaces due to the filter to occur in wrong directions (in FIG. 15(F) the isosurface expands downwards and to the right). A similar phenomenon also occurred in the actual data (FIG. 14(B)).

On the other hand, in the Consensus method all the holes were filled smoothly, so the quality of interpolation was the best among the methods tested as shown in FIG. 13(C) and FIG. 14(C). However, since the calculation of the signed distance field in the Consensus method used the Euclidean distance, the processing required a long time.

For the proposed method, there were some unnatural parts among the carved surfaces generated in the holes, but all the holes were filled, and the quality of interpolation was the best next to the Consensus method as shown in FIG. 13(D) and FIG. 14(D). Also, since the meshes were topologically equivalent to spheres, it is considered to be possible to improve the results by applying post-processes such as minimization of mesh curvature for the interpolated parts.

In addition, from FIG. 15(G), we can confirm that positive area of discriminant function C(v) (white color area) is a approximation of the shape of target object.

From Table on FIG. 10, it is confirmed that the computational times of the proposed method were 0.45-0.55 of the times for the SC method, and 0.15-0.17 of the time for the VD method when smoothing was not applied (smoothing is not applied in the SC method or the VD method). Even when smoothing was applied, the times were 0.65-0.74 of the times for the SC method, and 0.21-0.23 of the times for the VD method. As a result, we could confirm that the proposed method achieved fast computation with the GPU implementation with high quality. The details of the execution times of the proposed method are shown in the Tables on FIG. 11.

INDUSTRIAL APPLICABILITY

The present invention can be applied to 3D shape reconstruction software for CG modeling, reverse engineering and so on. By applying the present invention to the software, the required execution time to generate accurate 3D shape can be reduced.

What is claimed is:

1. An image processing apparatus for integrating a plurality of shape data representing a shape of an object, the apparatus comprising:
   a first calculation unit configured to receive 3-D positions representing voxels, each of which is a unit for dividing a 3-D space, and the shape data and to perform a calculation of first signed distances, each of which is a signed distance between the 3-D position and the shape data, on the shape data;
   a second calculation unit configured to classify the voxels into a voxel that is located in a near-surface of the shape, a voxel that is located outside of the shape, or a voxel that cannot be determined to be located outside of the shape or in the near-surface based on the 3-D position representing each of the voxels and one or both of any one of the plurality of shape data and the first signed distances;
   a third calculation unit configured to estimate whether the voxel that cannot be determined to be located outside of the shape or in the near-surface is located inside of the shape or outside of the shape based on one or both of the plurality of shape data and the first signed distances; and
   a fourth calculation unit configured to calculate the 3-D positions of the voxels that are classified to be located in the near-surface and the 3-D positions of the voxels that are located in a boundary portion between the voxels that are classified or estimated to be located inside the shape and the voxels that are classified or estimated to be located outside the shape, as surface positions of the shape, wherein
   the third calculation unit performs a Bayes estimation on the shape data to determine whether the voxel is located inside or outside the shape based on an average value of a probability distribution of the Bayes estimation.

2. The image processing apparatus according to claim 1, further comprising:
   a fifth calculation unit configured to calculate a second signed distance by integrating the first signed distances calculated with respect to the shape data,
   wherein in the fourth calculation unit, a value of the second signed distance is allocated to the voxels that are classified to be located in the near-surface, and an isosurface thereof is designated as the surface positions of the shape.

3. The image processing apparatus according to claim 1, wherein in the third calculation unit, the estimation is performed on all the voxels irrespective of a result of the second calculation unit.

4. The image processing apparatus according to claim 1, wherein in the third calculation unit, a value of the discriminant function that is equivalent to the Bayes estimation, and it is estimated based on the value of the discriminant function whether the voxel is located inside or outside the shape.

5. The image processing apparatus according to claim 1, wherein one or a plurality of processes of the first calculation unit to the fourth calculation unit is performed by a GPU.

6. The image processing apparatus according to claim 2, wherein one or a plurality of processes of the first calculation unit to the fifth calculation unit is performed by a GPU.

7. The image processing apparatus according to claim 2, wherein the processes of the first calculation unit and the fifth calculation unit are performed on a slice, which is a group of the voxels on one plane in the 3-D space, by a rendering function of the GPU.

8. The image processing apparatus according to claim 1, wherein the plurality of shape data includes data obtained by an active stereo method, and
   wherein information on whether or not light emitted from a light source used for measurement of the shape data passes through the voxel is used for the estimation of the fourth calculation unit.

9. The image processing apparatus according to claim 8, wherein a positional relationship among three positions of the position of the voxel, the light source position, and a position of intersection of a straight line passing through the voxel position and the light source position and the shape data is used for the estimation of the fourth calculation unit.

10. The image processing apparatus according to claim 9, wherein the positional relationship is obtained by using a distance image representing a distance from the light source position to the shape data.

11. The image processing apparatus according to claim 2, further comprising:
    a sixth calculation unit configured to generate the isosurface based on the second signed distance calculated by the fifth calculation unit.

12. The image processing apparatus according to claim 2, wherein the calculations of the first calculation unit to the fifth calculation unit are performed at a first resolution that is lower than a resolution of the shape data, and
    wherein the calculations of the first calculation unit to the fifth calculation unit are performed at a second resolution that is higher than the first resolution in an area where the voxel that is estimated to be in the near-surface of the shape exists or an area where the voxel that is estimated to be inside the shape and the voxel that is estimated to be outside the shape are in contact therewith.

13. An image processing method of integrating a plurality of shape data representing a shape, the method comprising:

a first step of receiving 3-D positions representing voxels, each of which is a unit for dividing a 3-D space, and the shape data and performing a calculation of first signed distances, each of which is a signed distance between the 3-D position and the shape data, on the shape data;

a second step of classifying the voxels into a voxel that is located in a near-surface of the shape, a voxel that is located outside of the shape, or a voxel that cannot be determined to be located outside of the shape or in the near-surface based on the 3-D position representing each of the voxels and one or both of any one of the plurality of shape data and the first signed distances;

a third step of estimating whether the voxel that cannot be determined to be located outside of the shape or in the near-surface is located inside of the shape or outside of the shape based on one or both of the plurality of shape data and the first signed distances, the third step including performing a Bayes estimation on the shape data to determine whether the voxel is located inside or outside the shape based on an average value of a probability distribution of the Bayes estimation; and a fourth step of calculating the 3-D positions of the voxels that are classified to be located in the near-surface and the 3-D positions of the voxels that are located in a boundary portion between the voxels that are classified or estimated to be located inside the shape and the voxels that are classified or estimated to be located outside the shape, as surface positions of the shape.

14. A non-transitory computer readable medium storing a program for executing functions of an image processing apparatus for integrating a plurality of shape data representing a shape, the functions comprising:

a first function for receiving 3-D positions representing voxels, each of which is a unit for dividing a 3-D space, and the shape data and performing a calculation of first signed distances, each of which is a signed distance between the 3-D position and the shape data, on the shape data;

a second function for classifying the voxels into a voxel that is located in a near-surface of the shape, a voxel that is located outside of the shape, or a voxel that cannot be determined to be located outside of the shape or in the near-surface based the 3-D position representing each of the voxels and on one or both of any one of the plurality of shape data and the first signed distances;

a third function for estimating whether the voxel that cannot be determined to be located outside of the shape or in the near-surface is located inside of the shape or outside of the shape based on one or both of the plurality of shape data and the first signed distances, the third function including performing a Bayes estimation on the shape data to determine whether the voxel is located inside or outside the shape based on an average value of a probability distribution of the Bayes estimation; and a fourth function for calculating the 3-D positions of the voxels that are classified to be located in the near-surface and the 3-D positions of the voxels that are located in a boundary portion between the voxels that are classified or estimated to be located inside the shape and the voxels that are classified or estimated to be located outside the shape, as surface positions of the shape.

15. An image processing apparatus for integrating a plurality of input shape data by using parallel calculation functions of a GPU, comprising:

a first storage area which is a portion of a storage unit of the GPU and which stores the shape data;

a second storage area which is a portion of the storage unit of the GPU and which stores information on voxels which are elements dividing a 3-D space;

a first calculation unit which is a portion of the parallel calculation unit of the GPU and which is configured to calculate first distances in parallel, each of said first distances is a distance between each of the voxels and the view position of the shape data, using a 3-D position representing each of the voxels and the view position;

a second calculation unit which is a portion of the parallel calculation unit of the GPU and which is configured to calculate second distances in parallel, each of said second distances is a distance between a projected point, said projected point is a projection of said 3-D position of the voxels to the shape data, and the view position;

a third calculation unit which is a portion of the parallel calculation unit of the GPU and which is configured to calculate first signed distances in parallel, each of said first signed distances is a signed distance between the first distance and the second distance, with respect to the shape data read from the first storage area;

a fourth calculation unit which is a portion of the calculation unit of the GPU and which is configured to calculate a second signed distance by integrating the first signed distances calculated with respect to the shape data and to store the second signed distance in the second storage area; and a fifth calculation unit configured to perform a Bayes estimation on the shape data to determine whether the voxel is located inside or outside the shape based on an average value of a probability distribution of the Bayes estimation.

16. The image processing apparatus according to claim 15, wherein the processes of the first calculation unit, the second calculation unit, the third calculation unit and the fourth calculation unit are performed on a slice, which is a group of the voxels on one plane in the 3-D space, by using a 2-D rendering function of the GPU.

17. The image processing apparatus according to claim 15, wherein in the first calculation unit, the second calculation unit and the third calculation unit, the first signed distance is calculated by a parallel calculation function of a shader function of the GPU.

18. The image processing apparatus according to claim 15, wherein in the fourth calculation unit, the second signed distance is calculated by using the blending function of the GPU.

19. The image processing apparatus according to claim 15, wherein in the third calculation unit and the fourth calculation unit, the first signed distance and the second signed distance are calculated by using a parallel calculation function of a shader of the GPU.

20. The image processing apparatus according to claim 15, wherein the shape data as a distance image are stored in the first storage area that is allocated as a texture area.

21. The image processing apparatus according to claim 15, wherein the shape data and values of the lost data of the shape data as an image are stored in the first storage area that is allocated as a texture area.

22. An image processing method of integrating a plurality of input shape data by using parallel calculation functions of a GPU, the method comprising:

a first step of acquiring a first storage area which is a portion of a storage unit of the GPU and which stores the shape data and a second storage area which is a portion of the storage unit of the GPU and which stores information on voxels which are elements dividing a 3-D space;

a second step of calculating first distances in parallel, each of said first distances is a distance between each of the voxels and the view position of the shape data, using a 3-D position representing each of the voxels and the view position by using the parallel calculation functions of the GPU;

a third step of calculating second distances in parallel, each of said second distances is a distance between a projected point, said projected point is a projection of said 3-D position of the voxels to the shape data, and the view position by using the parallel calculation functions of the GPU;

a fourth step of calculating first signed distances in parallel, each of said first signed distances is a signed distance between the first distance and the second distance, with respect to the shape data read from the first storage area by using the parallel calculation functions of the GPU;

a fifth step of calculating a second signed distance by integrating the first signed distances calculated with respect to the shape data and to store the second signed distance in the second storage area by using the calculation functions of the GPU; and a sixth step for performing a Bayes estimation on the shape data to determine whether the voxel is located inside or outside the shape based on an average value of a probability distribution of the Bayes estimation.

23. A non-transitory computer readable medium storing a program for executing functions of an image processing apparatus for integrating a plurality of input shape data by using calculation functions of a GPU, the functions comprising:

a first function for acquiring a first storage area which is a portion of a storage unit of the GPU and which stores the shape data and a second storage area which is a portion of the storage unit of the GPU and which stores information on voxels which are elements dividing a 3-D space;

a second function for calculating first distances in parallel, each of said first distances is a distance between each of the voxels and the view position of the shape data, using a 3-D position representing each of the voxels and the view position by using the parallel calculation functions of the GPU;

a third function for calculating second distances in parallel, each of said second distances is a distance between a projected point, said projected point is a projection of said 3-D position of the voxels to the shape data, and the view position by using the parallel calculation functions of the GPU;

a fourth function for calculating first signed distances in parallel, each of said first signed distances is a signed distance between the first distance and the second distance, with respect to the shape data read from the first storage area by using the parallel calculation functions of the GPU;

a fifth function for calculating a second signed distance by integrating the first signed distances calculated with respect to the shape data and to store the second signed distance in the second storage area by using the calculation functions of the GPU; and a sixth function for performing a Bayes estimation on the shape data to determine whether the voxel is located inside or outside the shape based on an average value of a probability distribution of the Bayes estimation.

* * * * *